United States Patent
Shah et al.

(10) Patent No.: US 11,636,019 B2
(45) Date of Patent: Apr. 25, 2023

(54) SYSTEMS AND METHODS FOR DYNAMICALLY SIMULATING LOAD TO AN APPLICATION UNDER TEST

(71) Applicant: Walmart Apollo, LLC, Bentonville, AR (US)

(72) Inventors: Ashish S. Shah, Bangalore (IN); Arup K. Khan, Bangalore (IN); Mohammed Valiyullah, Bangalore (IN); Irfan B. Rabban Sab, Bengaluru (IN)

(73) Assignee: WALMART APOLLO, LLC, Bentonville, AR (US)

( * ) Notice: Subject to any disclaimer, the term of this patent is extended or adjusted under 35 U.S.C. 154(b) by 55 days.

(21) Appl. No.: 16/926,366

(22) Filed: Jul. 10, 2020

(65) Prior Publication Data

US 2021/0011828 A1    Jan. 14, 2021

Related U.S. Application Data

(60) Provisional application No. 62/895,682, filed on Sep. 4, 2019.

(30) Foreign Application Priority Data

Jul. 11, 2019 (IN) .............. 201941027779

(51) Int. Cl.
 G06F 11/34    (2006.01)
 G06F 11/36    (2006.01)
 G06F 9/455    (2018.01)

(52) U.S. Cl.
 CPC ...... *G06F 11/3414* (2013.01); *G06F 9/45558* (2013.01); *G06F 11/3433* (2013.01);
 (Continued)

(58) Field of Classification Search
 CPC ............. G06F 11/3414; G06F 11/3433; G06F 11/3688; G06F 11/3692; G06F 9/45558; G06F 2009/45591; G06F 2009/45595
 (Continued)

(56) References Cited

U.S. PATENT DOCUMENTS 6,249,886 B1    6/2001    Kalkunte
6,434,513 B1    8/2002    Sherman
(Continued)

OTHER PUBLICATIONS

GITHUB; "JMeter Control Center"; https://github.com/innogames/JMeter-Control-Center; Available as early as Jun. 26, 2019; pp. 1-7.
(Continued)

*Primary Examiner* — Hang Pan
*Assistant Examiner* — Bradford F Wheaton
(74) *Attorney, Agent, or Firm* — Fitch, Even, Tabin & Flannery LLP

(57) ABSTRACT

In some embodiments, apparatuses and methods are provided herein useful to simulate a load to an application under test. In some embodiments, there is provided a system including one or more control circuits configured to implement a plurality of agent test virtual machines (VMs) each cooperatively configured to simulate a load; a database; and a main control circuit configured to execute in parallel a load testing tool associated with each agent test VM. The main control circuit configured to send an execute signal; change a status of at least one of free agent test VMs to a running agent test VM; in response to a determination to increase an overall simulated load, send the execute signal to another one of the free agent test VMs; and in response to a determination to decrease the overall simulated load, send a stop signal to one of running agent test VMs.

16 Claims, 8 Drawing Sheets

(52) U.S. Cl.
CPC ...... *G06F 11/3688* (2013.01); *G06F 11/3692* (2013.01); *G06F 2009/45591* (2013.01); *G06F 2009/45595* (2013.01)

(58) Field of Classification Search
USPC .......................................................... 717/124
See application file for complete search history.

(56) References Cited

U.S. PATENT DOCUMENTS

| | | | | |
|---|---|---|---|---|
| 6,601,020 | B1* | 7/2003 | Myers | G06F 11/3414 |
| | | | | 455/67.14 |
| 6,694,288 | B2 | 2/2004 | Smocha | |
| 7,620,856 | B2 | 11/2009 | Kagan | |
| 7,630,862 | B2 | 12/2009 | Glas | |
| 9,014,191 | B1* | 4/2015 | Mandal | H04L 45/04 |
| | | | | 370/392 |
| 9,116,873 | B2 | 8/2015 | Majumdar | |
| 9,372,842 | B2* | 6/2016 | Chikovani | G06F 40/197 |
| 9,405,863 | B1* | 8/2016 | Helikar | G16B 5/30 |
| 2005/0060687 | A1* | 3/2005 | Ghazaleh | G06F 8/10 |
| | | | | 717/123 |
| 2005/0262412 | A1* | 11/2005 | Mukai | G01R 31/318342 |
| | | | | 714/742 |
| 2011/0029971 | A1* | 2/2011 | Yamasaki | G06F 9/45558 |
| | | | | 718/1 |
| 2017/0129349 | A1* | 5/2017 | Solomon | G07C 9/21 |
| 2019/0354467 | A1* | 11/2019 | Wiener | G06F 8/433 |
| 2021/0014165 | A1* | 1/2021 | Kimura | H04L 47/2441 |

OTHER PUBLICATIONS

IBM; "IBM Rational Performance Tester"; https://www.ibm.com/us-en/marketplace/ibm-rational-performance-tester; Available as early as Jul. 5, 2019; pp. 1-4.
ORACLE; "Oracle Load Testing"; https://www.oracle.com/technetwork/oem/pdf/511887.pdf; pp. 1-3.
RADVIEW; "Test Execution"; https://www.radview.com/about-webload/features/test-execution/; Available as early as Jun. 27, 2019; pp. 1-5.

* cited by examiner

SYSTEMS AND METHODS FOR DYNAMICALLY SIMULATING LOAD TO AN APPLICATION UNDER TEST

CROSS-REFERENCE TO RELATED APPLICATIONS

This application claims the benefit of the following Indian Provisional Application 201941027779 filed Jul. 11, 2019 and the following U.S. Provisional Application No. 62/895,682 filed Sep. 4, 2019, all of which are incorporated herein by reference in their entirety.

TECHNICAL FIELD

This invention relates generally to simulating load to an application under test.

BACKGROUND

Generally, to increase and/or decrease a simulated load to an application under test, a currently running load testing tool has to be stopped and then the number of simulated load is changed. Subsequently, the load testing tool is then restarted with the new number of simulated load. As such, testing time is longer and may not be as comprehensive as desired by a user. In addition, there is generally a maximum number of load that can be simulated in the load testing tool. As such, testing the performance, for example, of the application under test is limited to this maximum number of load.

BRIEF DESCRIPTION OF THE DRAWINGS

Disclosed herein are embodiments of systems, apparatuses and methods pertaining to unlimited generation of load agents to dynamically simulate load to an application under test (AUT). This description includes drawings, wherein.

Figure 1:
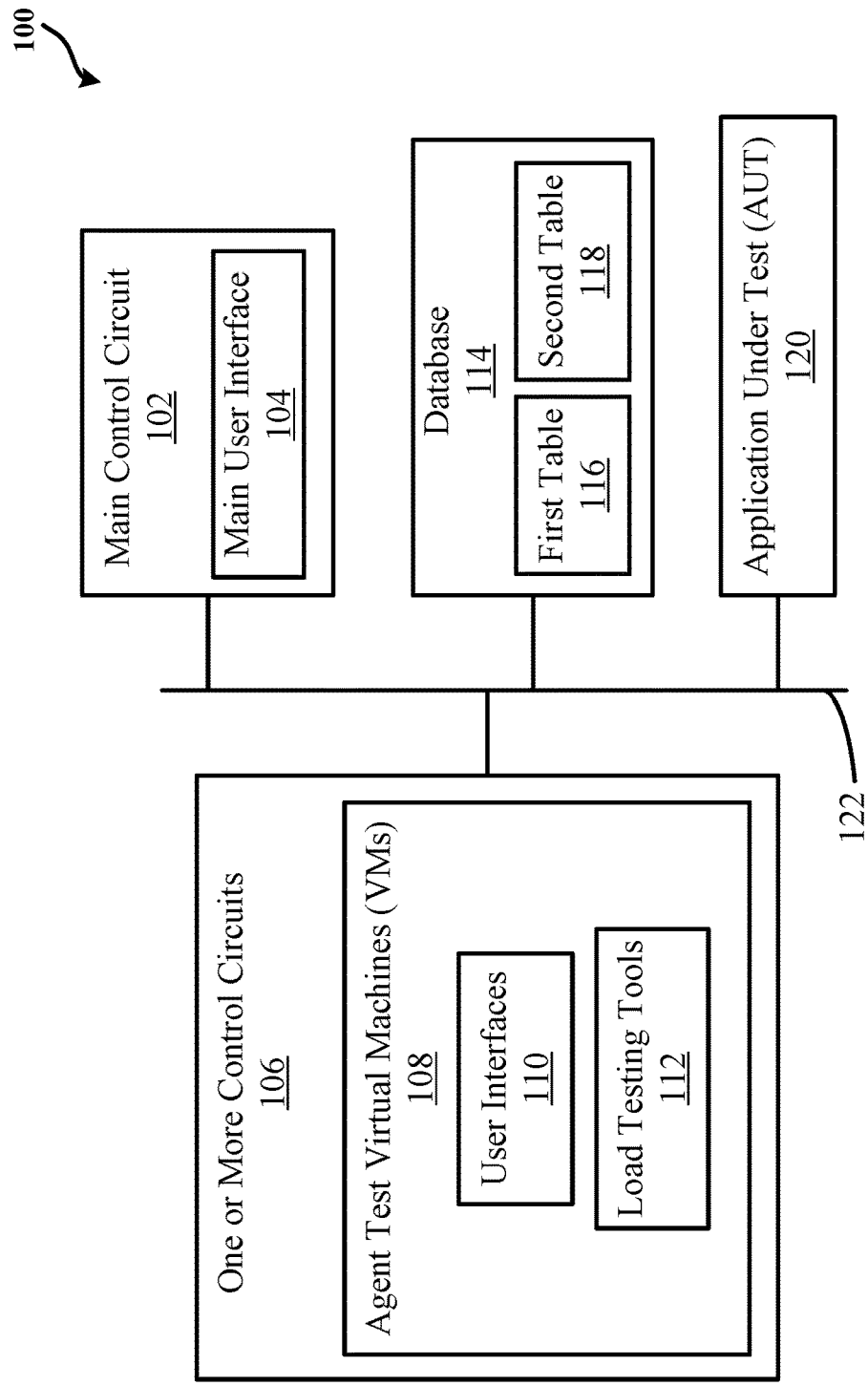
FIG. 1 illustrates a simplified block diagram of an exemplary system for unlimited generation of load agents to dynamically simulate a load to an AUT in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful for unlimited generation of load agents to dynamically simulate a load to an application under test (AUT) during use of the application. By one approach, the system includes one or more control circuits that may implement a plurality of agent test virtual machines (VMs) each cooperatively may simulate a load to the application under test (AUT) during the use of the application, and when executed, each of the plurality of agent test VMs may provide a user interface that may receive at least a first user input corresponding to a number of users of simulated load. Alternatively or in addition to, each of the plurality of agent test VMs may provide a load testing tool stored in a local memory associated with the agent test VM and has a fixed load based on the number of users input by a user. In one configuration, the system may include a database coupled to the plurality of agent test VMs. By one approach, the database may store a first table and a second table. For example, the first table may include first identifiers associated with one or more free agent test VMs of the plurality of agent test VMs. In such an example, the one or more free agent test VMs may correspond to those agent test VMs that are waiting to receive an execute signal to execute the load testing tool. In another example, the second table may include second identifiers associated with one or more running agent test VMs of the plurality of agent test VMs. In such an example, the one or more running agent test VMs may correspond to those agent test VMs that are currently in test mode simulating the load to the AUT.

By another approach, the system may include a main control circuit coupled to the one or more control circuits and/or the database. In one configuration, the main control circuit may execute in parallel the load testing tool associated with each of the plurality of agent test VMs. In one example, the main control circuit may send the execute signal to at least one of the one or more free agent test VMs to cause the at least one of the one or more free agent test VMs to initiate simulating the load to the AUT. Alternatively or in addition to, the main control circuit may change a status of the at least one of the one or more free agent test VMs to a running agent test VM by moving a corresponding identifier associated with the at least one of the one or more free agent test VMs to the second table. By one approach, each of the one or more running agent test VMs is separately and in parallel executing corresponding load testing tool to simulate the load to the AUT. In one configuration, the main control circuit may, in response to a determination to increase an overall simulated load to the AUT, send the execute signal to another one of the one or more free agent test VMs to cause the another one of the one or more free agent test VMs to initiate simulating the load to the AUT. In some implementations, the overall simulated load may correspond to an aggregate of the load simulated by each of the one or more running agent test VMs. Alternatively or in addition to, the main control circuit may, in response to a determination to decrease the overall simulated load to the AUT, send a stop signal to one of the one or more running agent test VMs on the second table to cause the one of the one or more running agent test VMs to stop simulating the load to the AUT. In some implementations, a status of the one of the one or more running agent test VMs receiving the stop signal may change from the running agent test VM to a free agent test VM by moving a corresponding identifier associated with the one of the one or more running agent test VMs to the first table.

In some embodiments, a method for unlimited generation of load agents to dynamically simulate a load to an application under test (AUT) during use of the application includes sending, by a main control circuit coupled to one or more control circuits and a database, an execute signal to at least one of one or more free agent test Virtual Machines (VMs) of a plurality of agent test VMs to cause the at least one of the one or more free agent test VMs to initiate simulating a load to the application under test (AUT). In some implementations, the one or more control circuits may implement the plurality of agent test VMs each cooperatively may simulate the load to the AUT during the use of the application. In such an implementation, when executed, each of the plurality of agent test VMs may provide a user interface and a load testing tool. In one scenario, the user interface may receive at least a first user input corresponding to a number of users of simulated load. Alternatively or in addition to, a load testing tool may be stored in a local memory associated with the agent test VM. By one approach, the load testing tool may have a fixed load based on the number of users input by a user. In some configurations, the database may store a first table and a second table. For example, the first table may include first identifiers associated with one or more free agent test VMs of the plurality of agent test VMs. In such an example, the one or more free agent test VMs may correspond to those agent control circuits that are waiting to receive an execute signal to execute the load testing tool. In another example, the second table may include second identifiers associated with one or more running agent test VMs of the plurality of agent test VMs. In one configuration, the one or more running agent test VMs may correspond to those agent test VMs that are currently in test mode simulating the load to the AUT. In some implementation, the main control circuit may execute in parallel the load testing tool associated with each of the plurality of agent test VMs.

Alternatively or in addition to, the method may include changing, by the main control circuit, a status of the at least one of the one or more free agent test VMs to a running agent test VM by moving a corresponding identifier associated with the at least one of the one or more free agent test VMs to the second table. In one configuration, each of the one or more running agent test VMs may separately and in parallel execute corresponding load testing tool to simulate the load to the AUT. Alternatively or in addition to, the method may include sending, by the main control circuit, the execute signal to another one of the one or more free agent test VMs to cause the another one of the one or more free agent test VMs to initiate simulating the load to the AUT in response to a determination to increase an overall simulated load to the AUT. Alternatively or in addition to, the method may include sending, by the main control circuit, a stop signal to one of the one or more running agent test VMs on the second table to cause the one of the one or more running agent test VMs to stop simulating the load to the AUT in response to a determination to decrease the overall simulated load to the AUT. By one approach, a status of the one of the one or more running agent test VMs receiving the stop signal may change from the running agent test VM to a free agent test VM by moving a corresponding identifier associated with the one of the one or more running agent test VMs to the first table.

Figure 4:
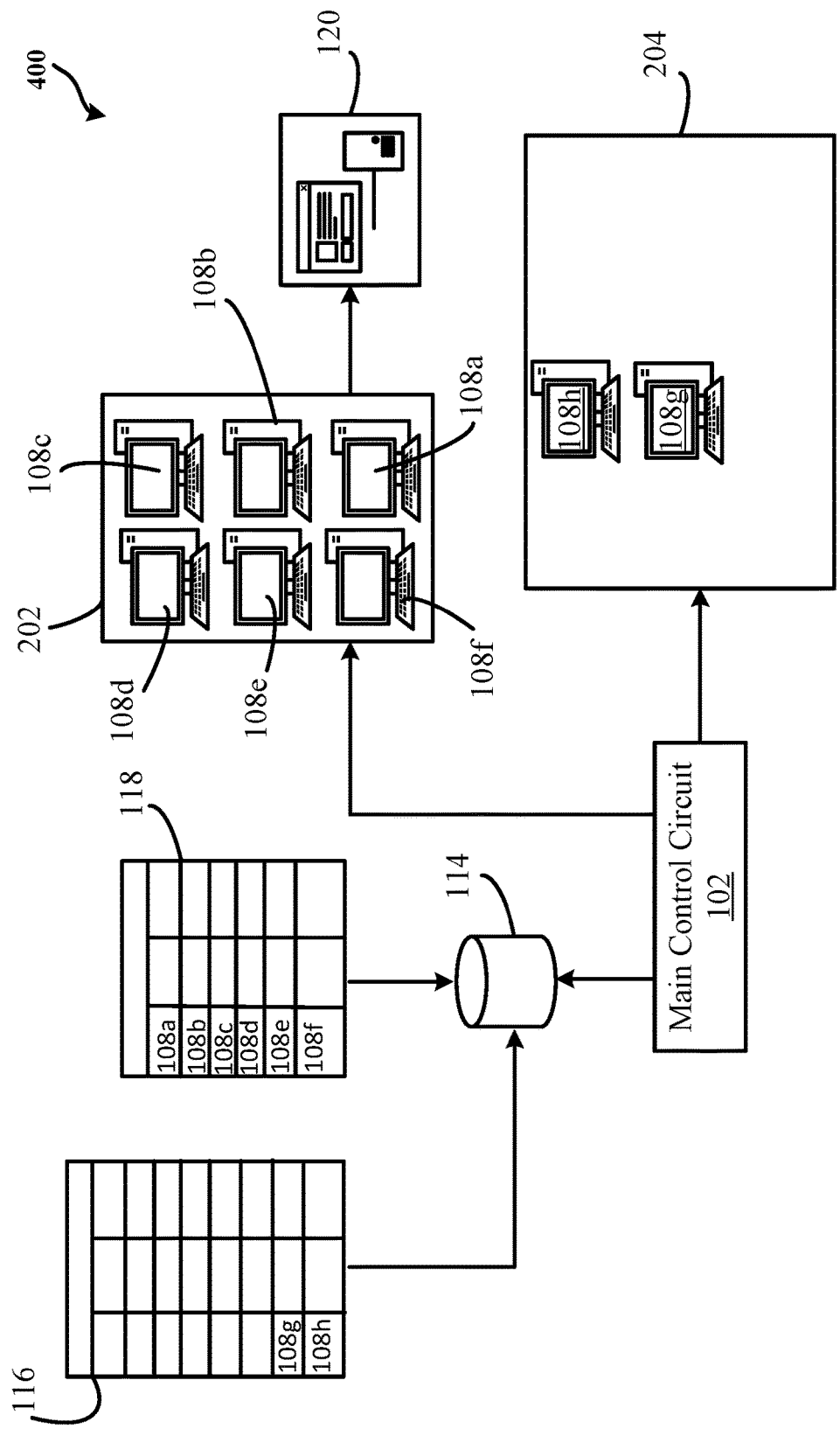
Figure 5:
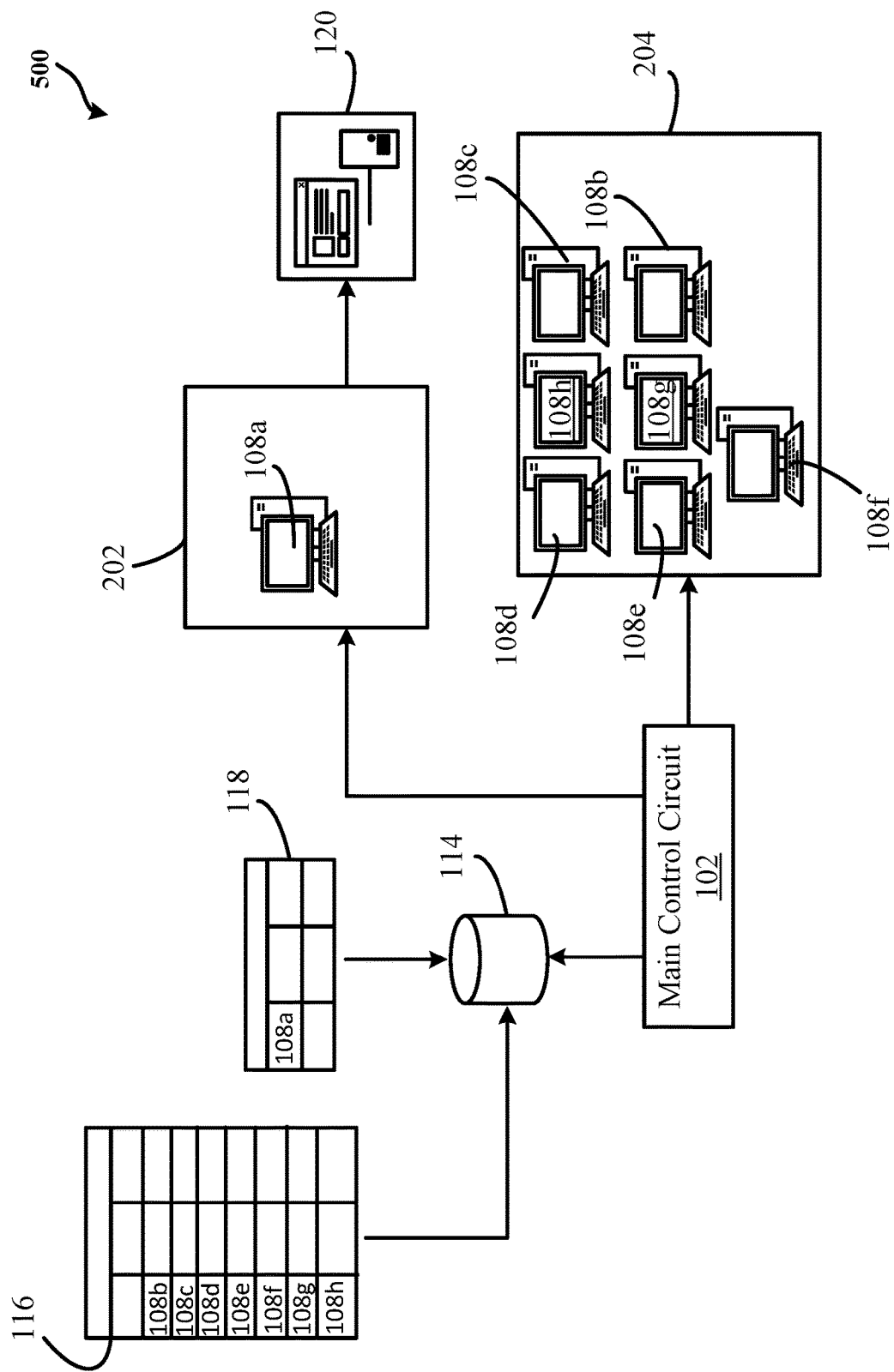
Figure 6:
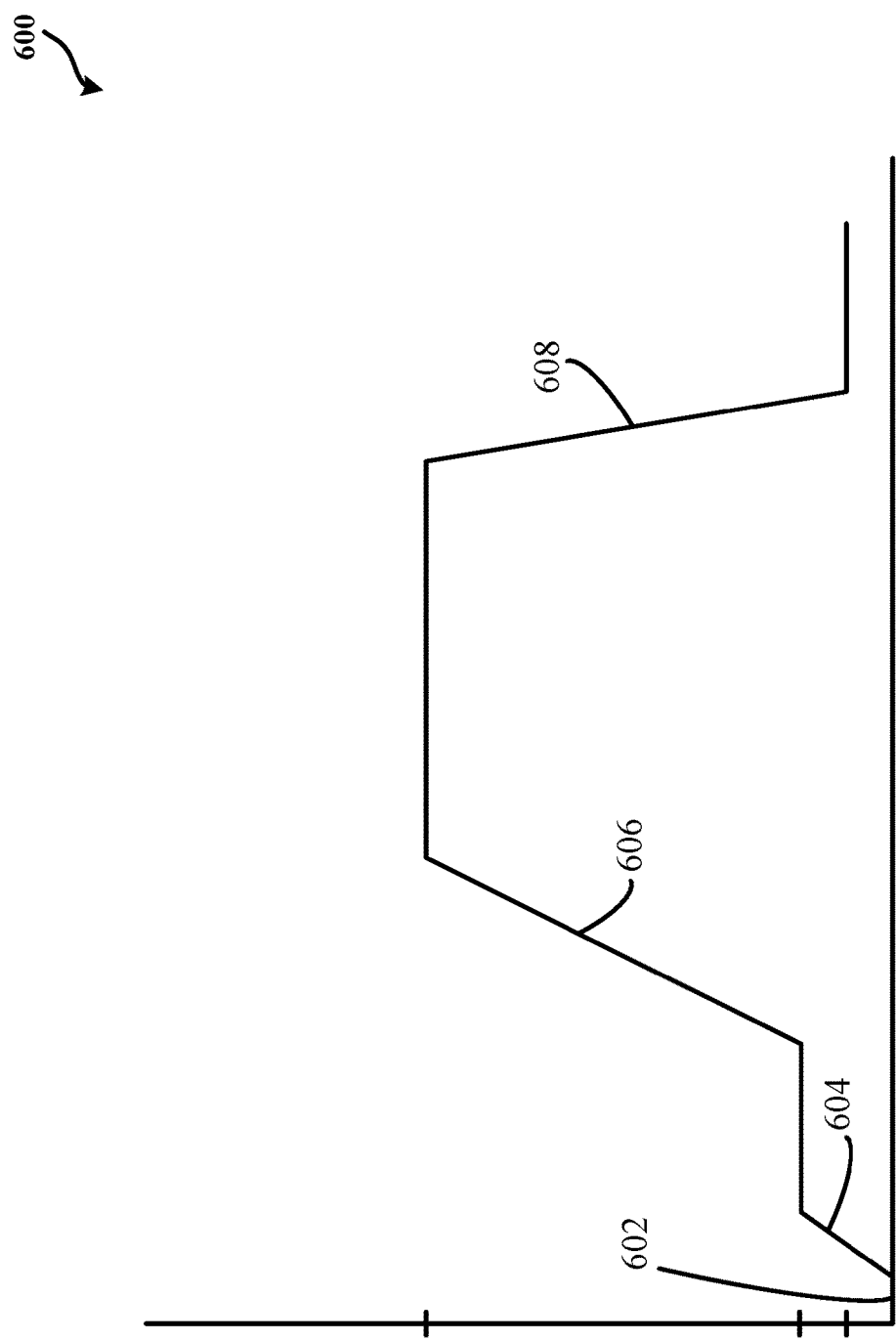
FIG. 6 is a graphical illustration on effects of dynamically increasing and decreasing simulated load to an AUT in accordance with some embodiments.
Figure 7:
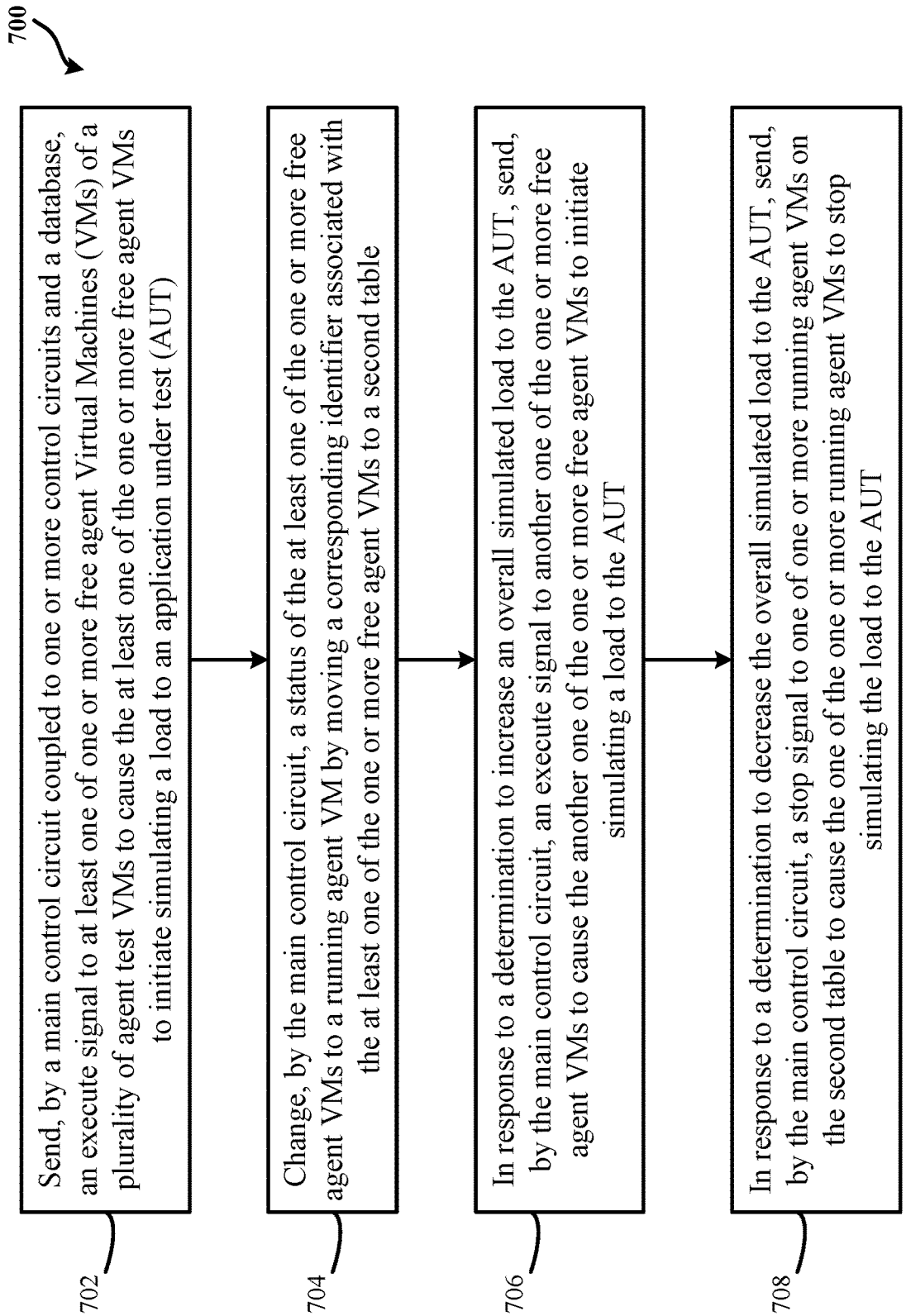
FIG. 7 shows a flow diagram of an exemplary process of unlimited generation of load agents to dynamically simulate a load to an AUT in accordance with some embodiments.

To illustrate, FIGS. 1-8 are described below. FIG. 1 illustrates a simplified block diagram of an exemplary system 100 for unlimited generation of load agents to dynamically simulate a load to an application under test (AUT) 120 during use of the application in accordance with some embodiments. Elements in FIG. 1 are further described in FIGS. 2-5. FIGS. 2-5 are simplified schematic illustrations of exemplary systems for unlimited generation of load agents to dynamically simulate a load to an AUT in accordance with some embodiments. FIG. 6 is a graphical illustration on effects of dynamically increasing and decreasing simulated load to an AUT in accordance with some embodiments. FIG. 7 shows a flow diagram of an exemplary process (e.g. method 700) of unlimited generation of load agents to dynamically simulate a load to an AUT in accordance with some embodiments. For example, the system includes one or more control circuits 106. By one approach, the one or more control circuits 106 may implement a plurality of agent test virtual machines (VMs) 108. In one configuration, each agent test VM 108a-108h of FIGS. 2-5 may cooperatively simulate a load to the AUT 120 during the use of the application. In such a configuration, each agent test VM 108a-108h, when executed, may provide a user interface 110. For example, the user interface 110 may include a touch screen, a keyboard, a wired and/or wired input device capable of interfacing with the corresponding agent test VM to relay and/or translate commands input by a user, and/or one or more application windows on a screen monitor associated with the corresponding agent test VM. By one approach, the user interface 110 may receive at least a first user input corresponding to a number of users of simulated load. Alternatively or in addition to each agent test VM 108a-108h, when executed, may provide a load testing tool 112. By one approach, the load testing tool 112 may include proprietary load testing tools and/or open source load testing tools (e.g., Apache JMeter, Taurus, The Grinder, Gatling, Multi-Mechanize, Siege, etc.). In one example, the load testing tool 112 may be stored in a local memory (not shown) associated with the agent test VM 108a-108h and has a fixed load based on the number of users input by a user. In some scenarios, a load may include traffic hits, active users, workload, and/or traffic throughput of the AUT 120. In some implementations, the load testing tool 112 may analyze and/or measure performance of the AUT 120 under various loads. By one approach, the AUT 120 may include a retailer's website, a web application, a standalone application, and/or an e-commerce website.

Figure 2:
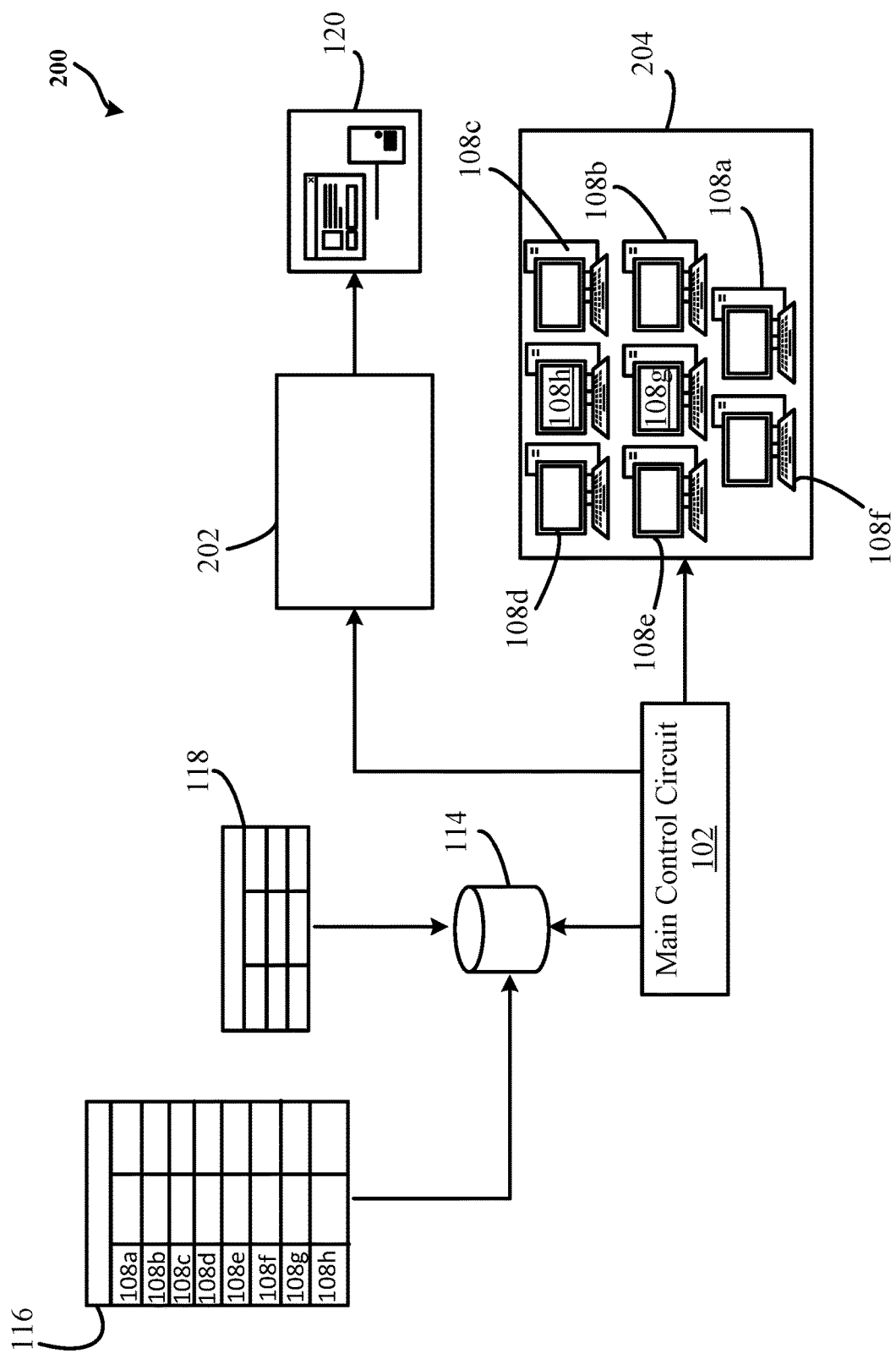
FIGS. 2-5 are simplified schematic illustrations of an exemplary system for unlimited generation of load agents to dynamically simulate a load to an AUT in accordance with some embodiments.

Alternatively or in addition to, a database 114 may couple to the plurality of agent test VMs 108 via a network 122. In one scenario, the network 122 may include Internet, wired and/or wireless communication network, local area network (LAN), wide area network (WAN), and/or Wi-Fi, among other types of networks that enable communications between one or more electronic devices (e.g., computers, servers, control circuits, databases, etc.). In another scenario, the database 114 may include one or more memory storage devices (e.g. hard drives, solid state drives, random access memory, read only memory, among other types of computing hardware capable of storing, porting, and/or extracting data files and/or objects temporarily and/or permanently). By one approach, the database 114 may store a first table 116 and a second table 118. For example, the first table 116 may include first identifiers associated with one or more free agent test VMs 204 of the plurality of agent test VMs 108. In one scenario, the first table 116 may include corresponding internet protocol (IP) addresses of the one or more free agent test VMs 204. In such an example, the one or more free agent test VMs 204 may correspond to those agent test VMs that are waiting to receive an execute signal to execute the load testing tool 112. By another approach, the second table 118 may include second identifiers associated with one or more running agent test VMs 202 of the plurality of agent test VMs 108. In one scenario, the second table 118 may include corresponding IP addresses of the one or more running agent test VMs 202. In such an approach, the one or more running agent test VMs 202 may correspond to those agent test VMs that are currently in test mode simulating the load to the AUT 120. Alternatively or in addition to, a main control circuit 102 may couple to the one or more control circuits 106 and/or the database 114 via the network 122. In one configuration, the main control circuit 102 may generate an identifier to associate with each of the plurality of agent test VMs 108. In such a configuration, the generation of an identifier to associate with each of the plurality of agent test VMs 108 may enable a user to check historical performance of various test runs and/or provide a capability of comparing the historical test results among various test runs. By one approach, the main control circuit 102 may execute in parallel the load testing tool 112 associated with each of the plurality of agent test VMs 108. In some implementations, the main control circuit 102 may, at step 702, send the execute signal to at least one of the one or more free agent test VMs 204 to cause the at least one of the one or more free agent test VMs 204 to initiate simulating the load to the AUT 120. To illustrate, an illustrative non-limiting example of an exemplary system 200 is shown in FIG. 2. The system 200 corresponds to a system with the one or more free agent test VMs 204 currently waiting to receive an execute signal from the main control circuit 102 to execute the load testing tool 112. By one approach, the main control circuit 102 may include a main user interface 104. For example, the main user interface 104 may include a touch screen, a keyboard, and/or a wired and/or wired input device capable of interfacing with the main control circuit 102 to relay and/or translate commands input by a user. In one configuration, the main user interface 104 may receive inputs and/or commands from one or more users to the main control circuit 102. For example, the main user interface 104 may receive a second user input corresponding to an overall simulated load to the AUT 120. In one scenario, the overall simulated load may correspond to a maximum and/or desired test load to the AUT 120 that a user would like to simulate to determine how the AUT 120 performs when under the maximum and/or desired test load.

In an illustrative non-limiting example, the user may input the overall simulated load to the main control circuit 102 via the main user interface 104. By one approach, one or more users may initiate the plurality of agent test VMs 108. In such an approach, to each agent test VM 108a-108h, the one or more users may provide a first user input corresponding to a number of users to simulate as a load to the AUT 120. In one example, the main control circuit 102 may provide the corresponding number of users to simulate to each agent test VM 108a-108h based on the overall simulated load. Alternatively or in addition to, the main control circuit 102 may determine a count of agent test VMs to satisfy the overall simulated load. As such, the main control circuit 102 may provide the determined count to the one or more users via the user interface 110 and/or the main user interface 104. In an illustrative non-limiting example, FIG. 2 shows that agent test VMs 108a, 108b, 108c, 108d, 108e, 108f, 108g, and 108h are the one or more free agent test VMs 204 waiting to receive an execute signal to initiate execution of the load testing tool 112 that is associated with each test VM, as illustrated by the agent test VMs being inside an illustrative box associated with the one or more free agent test VMs 204 and a listing of agent test VMs in the first table 116. In FIG. 2, there are no agent test VMs that are currently in test mode simulating the load to the AUT 120, as illustrated by an empty illustrative box associated with the one or more running agent test VMs 202 and by an empty second table 118. Thus, the main control circuit 102 may keep track of which agent test VMs are currently waiting and/or running based on whether the agent test VM is associated with the first table 116 or the second table 118.

Figure 3:
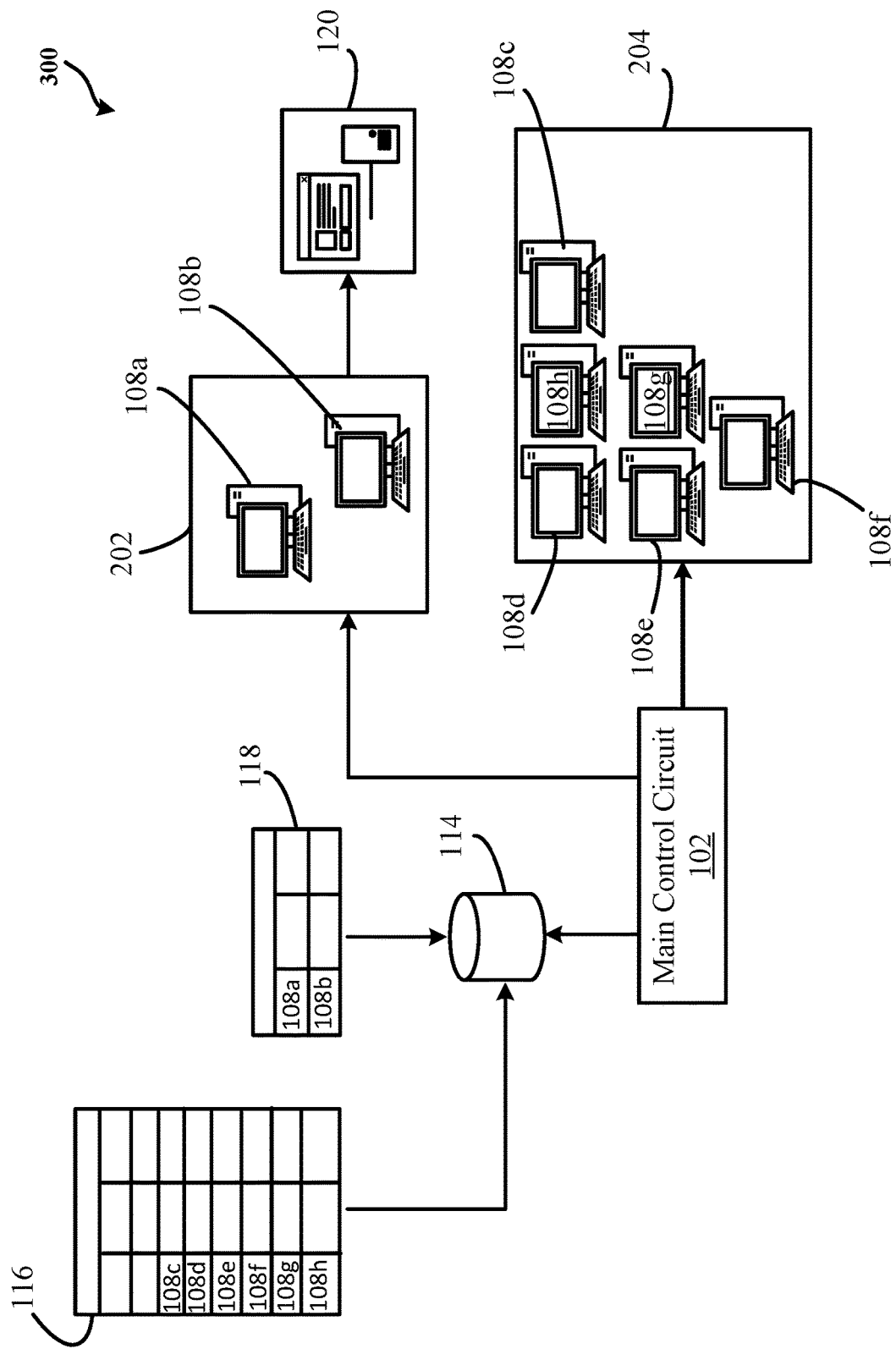

An illustrative non-limiting example of an exemplary system 300 is shown in FIG. 3. The system 300 corresponds to a system where the main control circuit 102 may initiate providing and/or sending execute signal to one or more free agent test VMs 204. By one approach, the main control circuit 102 may provide an execute signal to a first agent test VM 108a and to a second agent test VM 108b. In response, the load testing tool 112 associated with each of the first and second agent test VMs 108a, 108b may start execution to simulate load to the AUT 120. In one configuration, the main control circuit 102 may, at step 704, change a status of the at least one of the one or more free agent test VMs (e.g., the first agent test VM 108a and the second agent test VM 108b) to a running agent test VM by moving a corresponding identifier associated with the at least one of the one or more free agent test VMs to the second table 118 (illustrated in FIG. 2 by moving identifiers corresponding to 108a and 108b from the first table 116 to the second table 118). As such, the first agent test VM 108a and the second agent test VM 108b are now associated with the one or more running agent test VMs 202. In such a configuration, each of the one or more running agent test VMs 202 is separately and in parallel executing corresponding load testing tool 112 to simulate the load to the AUT 120. For example, the first agent test VM 108a is executing the load testing tool 112 to simulate a first load to the AUT 120 while the second agent test VM 108b is executing the load testing tool 112 to simulate a second load to the AUT 120.

An illustrative non-limiting example of an exemplary system 400 is shown in FIG. 4. The system 400 corresponds to a system where the main control circuit 102 may increase the overall simulated load to the AUT 120. For example, the main control circuit 102 may receive a third user input corresponding to a percentage increase to the overall simulated load via the main user interface 104. By one approach, in response to receiving the third user input, the main control circuit 102 may determine a count of the another one of the one or more free agent test VMs 204 to send an execute signal. For example, the count may be determined by the main control circuit 102 based on the first user input corresponding to the number of users of simulated load by each of the one or more free agent test VMs 204. In one configuration, based on the third user input and/or in response to the percentage increase to the overall simulated load, the main control circuit 102 may determine which one of the one or more free agent test VMs 204 to send an execute signal. For example, the main control circuit 102 may implement a round robin, first in first out, and/or last in last out approach, among other approaches to determine which of the load testing tool 112 (or which of the free agent test VMs 204) to execute to increase the overall simulated load to the AUT 120. As illustrated in FIG. 4, to increase the overall simulated load to the AUT 120, the main control circuit 102 may have determined that the load testing tool 112 corresponding to each of the agent test VMs 108c through 108f will be executed. As such, the main control circuit 102 may, at step 706, send the execute signal to another one of the one or more free agent test VMs 204 (e.g., the agent test VMs 108c through 108f) to cause the another one of the one or more free agent test VMs 204 to initiate simulating the load to the AUT 120. In such an example, the overall simulated load may correspond to an aggregate of the load simulated by each of the one or more running agent test VMs (e.g., agent test VMs 108a, 108b). Thus, by sending the execute signal to each of the agent test VMs 108c through 108f and causing each to execute in parallel the corresponding load testing tool 112, the overall simulated load to the AUT 120 is increased by the aggregate, combined amount of load simulated by each of the agent test VMs 108c through 108f. By one approach, each identifier corresponding to each of the agent test VMs 108c through 108f is moved from the first table 116 to the second table 118 to indicate that the agent test VMs 108c through 108f are now identified as the one or more running agent test VMs 202 along with the agent test VMs 108a and 108b. Consequently, the agent test VMs 108g and 108h remain as among the one or more free agent test VMs 204.

An illustrative non-limiting example of an exemplary system 500 is shown in FIG. 5. The system 500 corresponds to a system where the main control circuit 102 may decrease the overall simulated load to the AUT 120. For example, the main control circuit 102 may receive a fourth user input corresponding to a percentage decrease to the overall simulated load to the AUT 120. By one approach, the main control circuit 102 may determine a count of the one of the one or more running agent test VMs 202 to send a stop signal in response to receiving the fourth user input. For example, the count may be determined by the main control circuit 102 based on the first user input corresponding to the number of users of simulated load by each of the one or more running agent test VMs 202. In one configuration, based on the fourth user input and/or in response to the percentage decrease to the overall simulated load, the main control circuit 102 may determine which one of the one or more running agent test VMs 202 to send a stop signal. For example, the main control circuit 102 may implement a round robin, first in first out, and/or last in last out approach, among other approaches to determine which of the load testing tool 112 (or which of the running agent test VMs 202) to stop its execution in order to decrease the overall simulated load to the AUT 120. As illustrated in FIG. 5, to decrease the overall simulated load to the AUT 120, the main control circuit 102 may have determined that the load testing tool 112 corresponding to each of the agent test VMs 108b through 108f will be stopped. As such, in response to a determination to decrease the overall simulated load to the AUT 120, the main control circuit 102 may, at step 708, send a stop signal to one of the one or more running agent test VMs 202 on the second table 118 to cause the one of the one or more running agent test VMs 202 to stop simulating the load to the AUT 120. In some implementation, in response to receiving the stop signal, a status of the one of the one or more running agent test VMs 202 (e.g., the agent test VMs 108b through 108f) receiving the stop signal is changed from a running agent test VM to a free agent test VM by moving a corresponding identifier associated with the one of the one or more running agent test VMs 202 to the first table 116 (e.g., the identifiers corresponding to the agent test VMs 108b through 108f are moved from the second table 118 to the first table 116).

To further illustrate, an illustrative graph 600 is shown in FIG. 6. For example, the user interface 110 of the agent test VM and/or the main user interface 104 is further configured to display graphical representations (e.g., the illustrative graph 600) of effects of increasing and/or decreasing the overall simulated load to the AUT 120. By one approach, the illustrative graph 600 shows the effects of dynamically increasing and/or decreasing the simulated load to an AUT 120. For example, at 602 of the graph 600 may illustrate a system (e.g., the system 200) with the one or more free agent test VMs 204 currently waiting to receive an execute signal from the main control circuit 102 to initiate execution of the load testing tool 112. In another example, at 604 of the graph 600 may illustrate a system (e.g., the system 300) where the main control circuit 102 may initiate providing and/or sending the execute signal to one or more free agent test VMs 204. In another example, at 606 of the graph 600 may illustrate a system (e.g., the system 400) where the main control circuit 102 may increase the overall simulated load to the AUT 120. In yet another example, at 608 of the graph 600 may illustrate a system (e.g., the system 500) where the main control circuit 102 may decrease the overall simulated load to the AUT 120. Thus, by executing multiple load testing tools 112 in parallel and/or simultaneously, a user may continuously, without interruption, test the performance of the AUT 120 under various loads for a period of time. Further, based on the ability to dynamically increase and/or decrease the load to the AUT 120, unnecessary delays generally associated with the conventional setup of executing a single load testing tool are eliminated.

In some embodiments, each time the load testing tool 112 is executed, a test result is generated and sent to a centralized data processing server (not shown) configured to process results sent from each of the plurality of agent test VMs 108. As such, the main control circuit 102 may not be engaged in result metrics processing, thereby eliminating possible issue with system resource utilization of the main control circuit 102.

Figure 8:
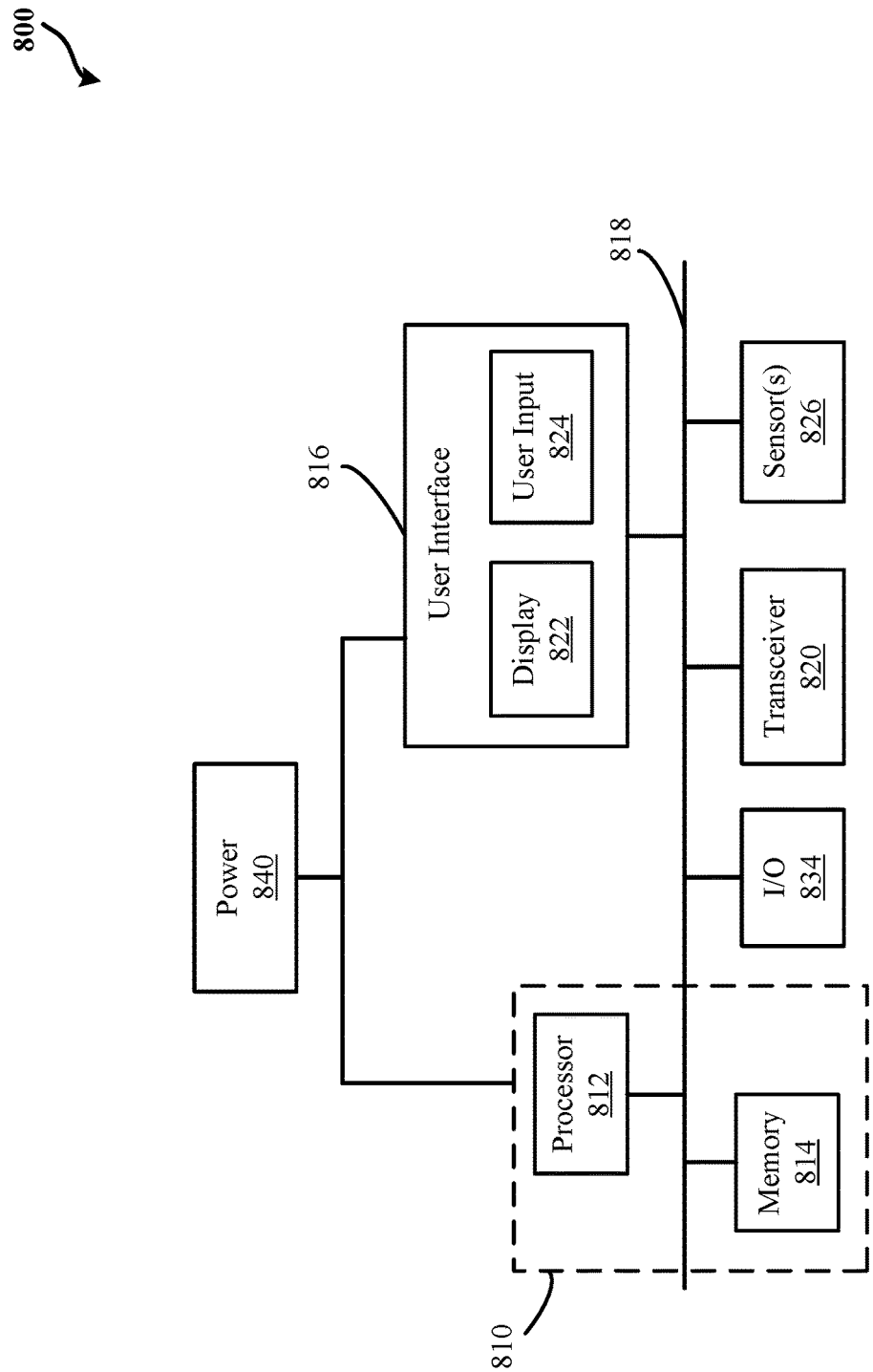
FIG. 8 illustrates an exemplary system for use in implementing methods, techniques, devices, apparatuses, systems, servers, sources and unlimited generation of load agents to dynamically simulate a load to an AUT, in accordance with some embodiments.

Further, the circuits, circuitry, systems, devices, processes, methods, techniques, functionality, services, servers, sources and the like described herein may be utilized, implemented and/or run on many different types of devices and/or systems. FIG. 8 illustrates an exemplary system 800 that may be used for implementing any of the components, circuits, circuitry, systems, functionality, apparatuses, processes, or devices of the system 100 of FIG. 1, the system 200 of FIG. 2, the system 300 of FIG. 3, the system 400 of FIG. 4, the system 500 of FIG. 5, the method 700 of FIG. 7, and/or other above or below mentioned systems or devices, or parts of such circuits, circuitry, functionality, systems, apparatuses, processes, or devices. For example, the system 800 may be used to implement some or all of the system for unlimited generation of load agents to dynamically simulate a load to an application under test (AUT) during use of the application, the AUT 120, the one or more control circuits 106, the plurality of agent test VMs 108, the user interface 110, the load testing tool 112, the database 114, the main control circuit 102, the main user interface 104, and/or other such components, circuitry, functionality and/or devices. However, the use of the system 800 or any portion thereof is certainly not required.

By way of example, the system 800 may comprise a processor module (or a control circuit) 812, memory 814, and one or more communication links, paths, buses or the like 518. Some embodiments may include one or more user interfaces 816, and/or one or more internal and/or external power sources or supplies 840. The control circuit 812 can be implemented through one or more processors, microprocessors, central processing unit, logic, local digital storage, firmware, software, and/or other control hardware and/or software, and may be used to execute or assist in executing the steps of the processes, methods, functionality and techniques described herein, and control various communications, decisions, programs, content, listings, services, interfaces, logging, reporting, etc. Further, in some embodiments, the control circuit 812 can be part of control circuitry and/or a control system 810, which may be implemented through one or more processors with access to one or more memory 814 that can store instructions, code and the like that is implemented by the control circuit and/or processors to implement intended functionality. In some applications, the control circuit and/or memory may be distributed over a communications network (e.g., LAN, WAN, Internet) providing distributed and/or redundant processing and functionality. Again, the system 800 may be used to implement one or more of the above or below, or parts of, components, circuits, systems, processes and the like. For example, the system 800 may implement the system for unlimited generation of load agents to dynamically simulate a load to an AUT with the main control circuit 102 being the control circuit 812.

The user interface 816 can allow a user to interact with the system 800 and receive information through the system. In some instances, the user interface 816 includes a display 822 and/or one or more user inputs 824, such as buttons, touch screen, track ball, keyboard, mouse, etc., which can be part of or wired or wirelessly coupled with the system 800. Typically, the system 800 further includes one or more communication interfaces, ports, transceivers 820 and the like allowing the system 800 to communicate over a communication bus, a distributed computer and/or communication network (e.g., a local area network (LAN), the Internet, wide area network (WAN), etc.), communication link 818, other networks or communication channels with other devices and/or other such communications or combination of two or more of such communication methods. Further the transceiver 820 can be configured for wired, wireless, optical, fiber optical cable, satellite, or other such communication configurations or combinations of two or more of such communications. Some embodiments include one or more input/output (I/O) interface 834 that allow one or more devices to couple with the system 800. The I/O interface can be substantially any relevant port or combinations of ports, such as but not limited to USB, Ethernet, or other such ports. The I/O interface 834 can be configured to allow wired and/or wireless communication coupling to external components. For example, the I/O interface can provide wired communication and/or wireless communication (e.g., Wi-Fi, Bluetooth, cellular, RF, and/or other such wireless communication), and in some instances may include any known wired and/or wireless interfacing device, circuit and/or connecting device, such as but not limited to one or more transmitters, receivers, transceivers, or combination of two or more of such devices.

In some embodiments, the system may include one or more sensors 826 to provide information to the system and/or sensor information that is communicated to another component, such as the AUT 120, the one or more control circuits 106, the plurality of agent test VMs 108, the user interface 110, the load testing tool 112, the database 114, the main control circuit 102, the main user interface 104, etc. The sensors can include substantially any relevant sensor, such as temperature sensors, distance measurement sensors (e.g., optical units, sound/ultrasound units, etc.), optical based scanning sensors to sense and read optical patterns (e.g., bar codes), radio frequency identification (RFID) tag reader sensors capable of reading RFID tags in proximity to the sensor, and other such sensors. The foregoing examples are intended to be illustrative and are not intended to convey an exhaustive listing of all possible sensors. Instead, it will be understood that these teachings will accommodate sensing any of a wide variety of circumstances in a given application setting.

The system 800 comprises an example of a control and/or processor-based system with the control circuit 812. Again, the control circuit 812 can be implemented through one or more processors, controllers, central processing units, logic, software and the like. Further, in some implementations the control circuit 812 may provide multiprocessor functionality.

The memory 814, which can be accessed by the control circuit 812, typically includes one or more processor readable and/or computer readable media accessed by at least the control circuit 812, and can include volatile and/or nonvolatile media, such as RAM, ROM, EEPROM, flash memory and/or other memory technology. Further, the memory 814 is shown as internal to the control system 810; however, the memory 814 can be internal, external or a combination of internal and external memory. Similarly, some or all of the memory 814 can be internal, external or a combination of internal and external memory of the control circuit 812. The external memory can be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over the computer network. The memory 814 can store code, software, executables, scripts, data, content, lists, programming, programs, log or history data, user information, customer information, product information, and the like. While FIG. 8 illustrates the various components being coupled together via a bus, it is understood that the various components may actually be coupled to the control circuit and/or one or more other components directly.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for unlimited generation of load agents to dynamically simulate a load to an application under test (AUT) during use of the application, the system comprising:
one or more control circuits configured to implement a plurality of agent test virtual machines (VMs) each cooperatively configured to simulate the load to the AUT during the use of the application, and when executed, each of the plurality of agent test virtual machines provides:
a user interface configured to receive at least a first user input corresponding to a number of users of simulated load; and a load testing tool stored in a local memory associated with the agent test VM and has a fixed load based on the number of users input by a user;

a database coupled to the plurality of agent test VMs and configured to store a first table and a second table, wherein the first table comprises first identifiers associated with one or more free agent test VMs of the plurality of agent test VMs, wherein the one or more free agent test VMs correspond to those agent test VMs that are waiting to receive an execute signal to execute the load testing tool, wherein the second table comprises second identifiers associated with one or more running agent test VMs of the plurality of agent test VMs, and wherein the one or more running agent test VMs correspond to those agent test VMs that are currently in test mode simulating the load to the AUT; and a main control circuit coupled to the one or more control circuits and the database, the main control circuit configured to execute in parallel the load testing tool associated with each of the plurality of agent test VMs, wherein the main control circuit is further configured to:

send the execute signal to at least one of the one or more free agent test VMs to cause the at least one of the one or more free agent test VMs to initiate simulating the load to the AUT;

change a status of the at least one of the one or more free agent test VMs to a running agent test VM by moving a corresponding identifier associated with the at least one of the one or more free agent test VMs from the first table to the second table, wherein each of the one or more running agent test VMs is separately and in parallel executing corresponding load testing tool to simulate the load to the AUT;

in response to a determination to increase an overall simulated load to the AUT, send the execute signal to another one of the one or more free agent test VMs to cause the another one of the one or more free agent test VMs to initiate simulating the load to the AUT, wherein the overall simulated load corresponds to an aggregate of the load simulated by each of the one or more running agent test VMs; and in response to a determination to decrease the overall simulated load to the AUT, send a stop signal to one of the one or more running agent test VMs on the second table to cause the one of the one or more running agent test VMs to stop simulating the load to the AUT, wherein a status of the one of the one or more running agent test VMs receiving the stop signal is changed from the running agent test VM to a free agent test VM by moving a corresponding identifier associated with the one of the one or more running agent test VMs from the second table to the first table, wherein the status of either being the running agent test VM or the free agent test VM is based on whether an identifier corresponding to an agent test VM is in the second table or the first table respectively, and wherein the main control circuit is distinct and separate from the one or more control circuits, wherein the user interface of the agent test VM is further configured to display graphical representations of effects of increasing and decreasing the overall simulated load to the AUT, wherein the main control circuit further comprises a main user interface configured to:

receive a second user input corresponding to the overall simulated load to the AUT;

receive a third user input corresponding to a percentage increase to the overall simulated load; and receive a fourth user input corresponding to a percentage decrease to the overall simulated load, and wherein the main control circuit is further configured to:

in response to receiving the third user input, determine a count of the another one of the one or more free agent test VMs to send the execute signal; and in response to receiving the fourth user input, determine a count of the one of the one or more running agent test VMs to send the stop signal.

2. The system of claim 1, wherein the load testing tool is configured to analyze and measure performance of the AUT under various loads, and wherein the load comprises traffic hits, active users, workload, and traffic throughput of the AUT.

3. The system of claim 1, wherein the AUT comprises a retailer's website, a web application, a standalone application, and an e-commerce website.

4. The system of claim 1, wherein the first table comprises corresponding IP addresses of the one or more free agent test VMs, and wherein the second table comprises corresponding IP addresses of the one or more running agent test VMs.

5. The system of claim 1, wherein the first table is designated for those agent test VMs that are waiting to receive the execute signal to execute the load testing tool, and wherein the second table is designated for those agent test VMs that are currently in the test mode simulating the load to the AUT.

6. The system of claim 1, wherein the main control circuit is further configured to determine to send the execute signal to the another one of the one or more free agent test VMs based on at least one of a round robin, a first in first out, or a last in last out approach.

7. The system of claim 1, wherein the user interface comprises a touch screen and a keyboard.

8. The system of claim 1, wherein the main control circuit is distinct and separate from the one or more control circuits.

9. A method for unlimited generation of load agents to dynamically simulate a load to an application under test (AUT) during use of the application, the method comprising:

sending, by a main control circuit coupled to one or more control circuits and a database, an execute signal to at least one of one or more free agent test Virtual Machines (VMs) of a plurality of agent test VMs to cause the at least one of the one or more free agent test VMs to initiate simulating the load to the AUT, wherein the one or more control circuits is configured to implement the plurality of agent test VMs each cooperatively configured to simulate the load to the AUT during the use of the application, and when executed, each of the plurality of agent test VMs provides:

a user interface configured to receive at least a first user input corresponding to a number of users of simulated load; and a load testing tool stored in a local memory associated with the agent test VM and has a fixed load based on the number of users input by a user, wherein the database is configured to store a first table and a second table, wherein the first table comprises first identifiers associated with the one or more free agent test VMs of the plurality of agent test VMs, wherein the one or more free agent test VMs correspond to those agent control circuits that are waiting to receive an execute signal to execute the load testing tool, wherein the second table comprises second identifiers associated with one or more running agent test VMs of the plurality of agent test VMs, and wherein the one or more running agent test VMs correspond to those agent test VMs that are currently in test mode simulating the load to the AUT, wherein the main control circuit is configured to execute in parallel the load testing tool associated with each of the plurality of agent test VMs;

changing, by the main control circuit, a status of the at least one of the one or more free agent test VMs to a running agent test VM by moving a corresponding identifier associated with the at least one of the one or more free agent test VMs from the first table to the second table, wherein each of the one or more running agent test VMs are separately and in parallel executing corresponding load testing tool to simulate the load to the AUT;

in response to a determination to increase an overall simulated load to the AUT, sending, by the main control circuit, the execute signal to another one of the one or more free agent test VMs to cause the another one of the one or more free agent test VMs to initiate simulating the load to the AUT;

in response to a determination to decrease the overall simulated load to the AUT, sending, by the main control circuit, a stop signal to one of the one or more running agent test VMs on the second table to cause the one of the one or more running agent test VMs to stop simulating the load to the AUT, wherein a status of the one of the one or more running agent test VMs receiving the stop signal is changed from the running agent test VM to a free agent test VM by moving a corresponding identifier associated with the one of the one or more running agent test VMs from the second table to the first table, wherein the status of either being the running agent test VM or the free agent test VM is based on whether an identifier corresponding to an agent test VM is in the second table or the first table respectively, and wherein the main control circuit is distinct and separate from the one or more control circuits;

displaying, by the user interface of the agent test VM, graphical representations of effects of increasing and decreasing the overall simulated load to the AUT;

receiving, by a main user interface of the main control circuit, a second user input corresponding to the overall simulated load to the AUT;

receiving, by the main user interface, a third user input corresponding to a percentage increase to the overall simulated load;

receiving, by the main user interface, a fourth user input corresponding to a percentage decrease to the overall simulated load;

in response to receiving the third user input, determining, by the main control circuit, a count of the another one of the one or more free agent test VMs to send the execute signal; and in response to receiving the fourth user input, determining, by the main control circuit, a count of the one of the one or more running agent test VMs to send the stop signal.

10. The method of claim 9, wherein the load testing tool is configured to analyze and measure performance of the AUT under various loads, and wherein the load comprises traffic hits, active users, workload, and traffic throughput of the AUT.

11. The method of claim 9, wherein the AUT comprises a retailer's website, a web application, a standalone application, and an e-commerce website.

12. The method of claim 9, wherein the first table comprises corresponding IP addresses of the one or more free agent test VMs, and wherein the second table comprises corresponding IP addresses of the one or more running agent test VMs.

13. The method of claim 9, wherein the first table is designated for those agent test VMs that are waiting to receive the execute signal to execute the load testing tool, and wherein the second table is designated for those agent test VMs that are currently in the test mode simulating the load to the AUT.

14. The method of claim 9, further comprising determining, by the main control circuit, to send the execute signal to the another one of the one or more free agent test VMs based on at least one of a round robin, a first in first out, or a last in last out approach.

15. The method of claim 9, wherein the user interface comprises a touch screen and a keyboard.

16. The method of claim 9, wherein the main control circuit is distinct and separate from the one or more control circuits.

* * * * *